(12) United States Patent
Groth et al.

(10) Patent No.: US 6,741,932 B1
(45) Date of Patent: May 25, 2004

(54) METHOD AND SYSTEM FOR USING REAL-TIME TRAFFIC BROADCASTS WITH NAVIGATION SYSTEMS

(75) Inventors: Eric Groth, Buffalo Grove, IL (US); Suzanne McGrath, Arlington Heights, IL (US); Timothy McGrath, Arlington Heights, IL (US); Lumumba Mbekeani, Oak Park, IL (US)

(73) Assignee: Navigation Technologies Corp., Chicago, IL (US)

( * ) Notice: Subject to any disclaimer, the term of this patent is extended or adjusted under 35 U.S.C. 154(b) by 48 days.

(21) Appl. No.: 10/123,587

(22) Filed: Apr. 16, 2002

(51) Int. Cl.[7] .............................................. G01C 21/34
(52) U.S. Cl. ...................................... 701/210; 701/117
(58) Field of Search ................................ 701/210, 117, 701/118, 200; 73/178 R; 340/988, 995.13

(56) References Cited

U.S. PATENT DOCUMENTS

| | | | |
|---|---|---|---|
| 5,546,107 A | 8/1996 | Deretsky et al. | 395/600 |
| 6,216,085 B1 * | 4/2001 | Emmerink et al. | 701/117 |
| 6,338,019 B1 | 1/2002 | Duckeck | 701/200 |
| 6,434,477 B1 | 8/2002 | Goss et al. | |
| 6,453,230 B1 * | 9/2002 | Geurts | 701/117 |
| 6,594,282 B1 * | 7/2003 | Kynast et al. | 370/493 |

FOREIGN PATENT DOCUMENTS

EP  1 004 852 A2  8/1999  ........... G01C/21/34

* cited by examiner

Primary Examiner—William A. Cuchlinski, Jr.
Assistant Examiner—Olga Hernandez
(74) Attorney, Agent, or Firm—Frank J. Kozak; Jon D. Shutter; Lawrence M. Kaplan

(57) ABSTRACT

A system and method are disclosed that provide traffic information to end users. The traffic information is contained in traffic data messages that use location reference codes to identify locations along roads. A data structure is formed that relates a set of location reference codes assigned to locations along roads by a first data supplier to another set of location reference codes assigned locations along roads by a second data supplier. The data structure is used to form traffic data messages containing location reference codes assigned by the first data supplier based on traffic data messages containing location reference codes assigned by the second data supplier.

31 Claims, 11 Drawing Sheets

OVERALL PROCESS

METHOD AND SYSTEM FOR USING REAL-TIME TRAFFIC BROADCASTS WITH NAVIGATION SYSTEMS

BACKGROUND OF THE INVENTION

The present invention relates to a system and method for providing real-time traffic data to vehicles traveling on roads, and more particularly, the present invention relates to a system and method that enables use of real-time traffic data with navigation data.

In some regional and metropolitan areas and countries, systems have been implemented that broadcast data messages that contain up-to-the-minute reports of traffic and road condition information. These systems broadcast these data messages on a continuous, periodic, or frequently occurring basis. These data messages are received by receivers installed in vehicles that travel in the region. The receivers decode the data messages and make the information in the messages available to the vehicle drivers.

These traffic data message broadcast systems have several advantages over the simple broadcasting of traffic reports over radio stations. For example, with these traffic data message broadcasting systems, a driver can obtain the traffic information quickly. The driver does not have to wait until a radio station broadcasts a traffic report. Another advantage of these traffic data message broadcast systems is that the driver does not have to listen to descriptions of traffic conditions for areas remote from his or her location. Another advantage of traffic data message broadcast systems is that more detailed and possibly more up-to-date information can be provided.

In these types of systems, the data messages conform to one or more pre-established specifications or formats. These specifications or formats are used by the on-board receivers in the vehicles that travel in the region to decode the traffic data messages.

One system for broadcasting real-time traffic and road condition information is the Radio Data System-Traffic Message Channel ("RDS-TMC"). The RDS-TMC system is used in some European countries. The RDS-TMC system is described in various publications, including "Radio Data System, CENELEC END50067:1996, Specification of the Radio Data System." The RDS-TMC system broadcasts messages to vehicles using an FM station data channel. RDS-TMC messages are broadcast regularly or at varying intervals depending on the priority of the events being reported. Similar or identical systems are being used or are being planned in other countries and regions.

For purposes of identifying specific locations along roads to which the traffic messages pertain, location reference codes are assigned to locations along roads in a region. The locations to which location reference codes are assigned include intersections, interchanges, or other points along roads. Then, data messages are broadcast identifying traffic conditions relating to these locations. Thus, location reference codes are assigned only to these heavily traveled roads and not to lightly traveled roads. In some regions, location reference codes are assigned by a government institution. In other regions, location reference codes are assigned by a private enterprise.

Another, separate technology that has developed to assist drivers is the vehicle navigation system. Vehicle navigation systems provide various navigating features to drivers of vehicles, as well as others. The features provided by vehicle navigation systems differ from those provided by a traffic broadcast system. For example, a vehicle navigation system can calculate a specific route for a driver. The route calculated for the driver can begin at any street location in a covered geographic area and have a destination located at any other street location in the covered geographic region. The vehicle navigation system may also provide route guidance to the driver. The route guidance function can also be specific to the route calculated for the driver. The route guidance function may provide maneuvering instructions, audibly or visually, to the driver as the route is being followed. The vehicle navigation system may also provide other features, such as finding one or more destinations of a particular type within a given search area, such as all the Italian restaurants within two miles of a present position of the vehicle. In order to provide these kinds of functions, the vehicle navigation system uses a detailed geographic database, either located in the vehicle or accessible over a wireless communication link.

Both traffic data broadcast systems and vehicle navigation systems are useful to drivers. However, it would be even more useful if the data in the traffic data messages could be used with a vehicle navigation system. For example, it would be advantageous if the data in the traffic messages could be utilized when calculating a route using the route calculation function in a vehicle navigation system.

A method for providing this feature is disclosed in EP 1 004 852 A2, entitled "METHOD AND SYSTEM FOR USING REAL-TIME TRAFFIC BROADCASTS WITH NAVIGATION SYSTEMS", the entire disclosure of which is incorporated by reference herein. EP 1 004 852 A2 discloses a method and system in which location reference codes used in traffic messages are related to geographic data used by navigation systems thereby enabling navigation systems to use the information contained in traffic message broadcasts.

A further consideration to be addressed is that different location reference code systems exist in some regions. This may result from the introduction of different location reference code systems over time. As a result, the location reference codes used by some systems (such as vehicle navigation systems) may not match the location reference codes contained in the traffic messages broadcast by some traffic information providers, and vice versa. Accordingly, it would be beneficial to have a way to use traffic messages that contain location reference codes assigned by one entity in systems that support location reference codes assigned by another entity.

SUMMARY OF THE INVENTION

To address the above concerns, a system and method are disclosed that provide traffic information to end users. The traffic information is contained in traffic data messages that use location reference codes to identify locations along roads. A data structure is formed that relates a set of location reference codes assigned to locations along roads by a first data supplier to another set of location reference codes assigned to locations along roads by a second data supplier. The data structure is used to form traffic data messages containing location reference codes assigned by the first data supplier based on traffic data messages containing location reference codes assigned by the second data supplier.

DETAILED DESCRIPTION OF THE PRESENTLY PREFERRED EMBODIMENTS

I. Traffic Broadcast System—Overview

Figure 1:
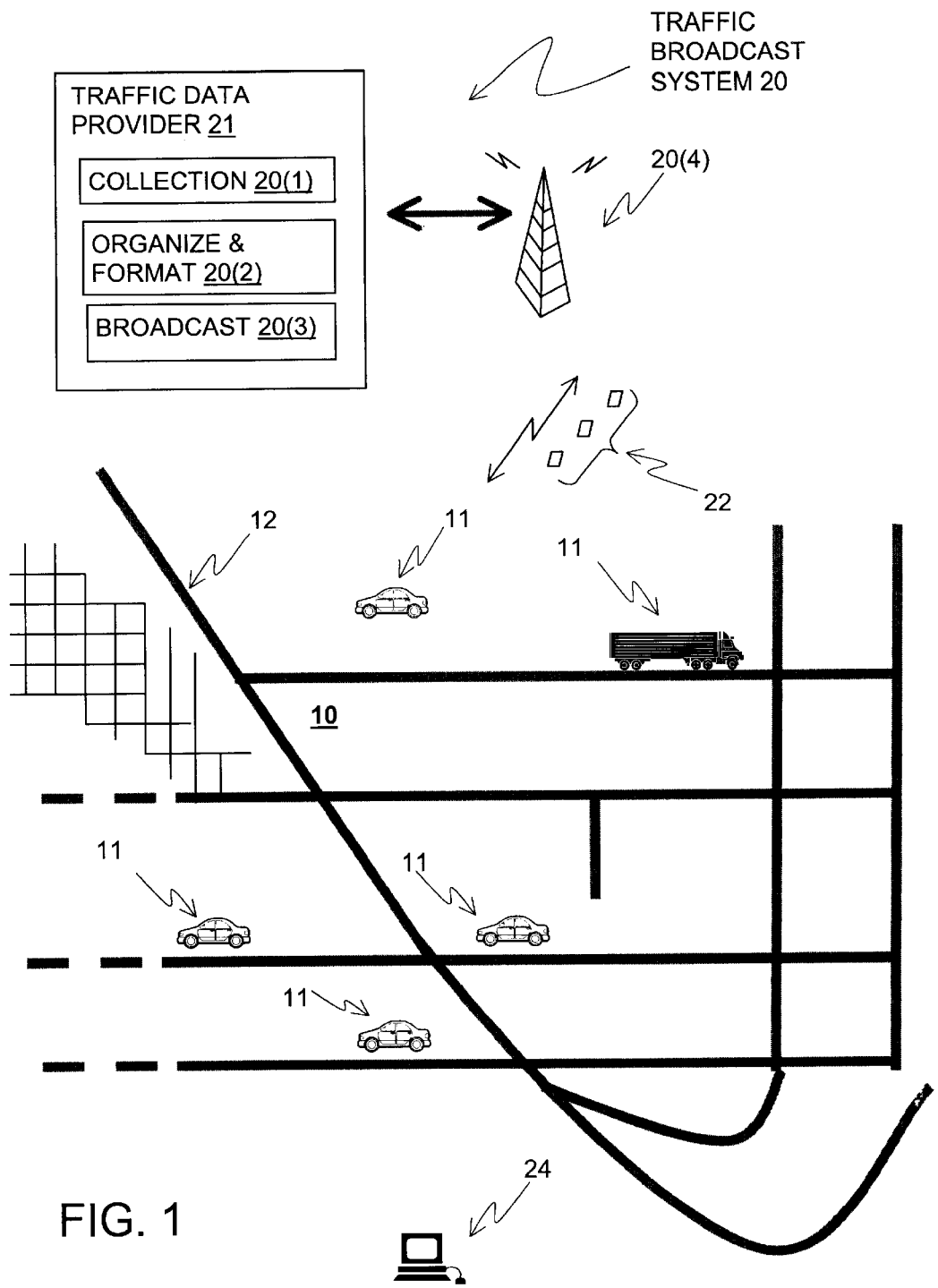
FIG. 1 is diagram illustrating components of a traffic broadcast system in a geographic region.

FIG. 1 is diagram illustrating a geographic region 10. The geographic region 10 may be a metropolitan area, such as the New York metropolitan area, the Los Angeles metropolitan area, or any other metropolitan area. Alternatively, the geographic region 10 may be a state, province, or country, such as California, Illinois, France, England, or Germany. Alternatively, the geographic region 10 can be combination of one or more metropolitan areas, states, countries and so on.

A traffic broadcast system 20 is located in the geographic region 10. The traffic broadcast system 20 broadcasts traffic messages 22 regarding the traffic and road conditions on a road network 12 in the geographic region 10. The traffic broadcast system 20 is operated by a traffic data provider 21. The traffic data provider 21 may be a government organization or may be privately operated. In one embodiment, the traffic broadcast system 20 conforms to the RDS (Radio Data System) standard, although alternative standards may be used.

Vehicles 11 travel on the road network 12 in the geographic region 10. The vehicles 11 may include cars, trucks, buses, bicycles, motorcycles, etc. Some or all of the vehicles 11 include suitable equipment that enables them to receive the traffic and road condition data broadcast by the traffic broadcast provider 21 over the traffic broadcast system 20.

The data messages 22 broadcast with the traffic broadcast system 20 may also be received and used in systems that are not installed in vehicles (e.g., "non-vehicles 24"). These non-vehicles 24 may include workstations, personal computers, personal digital assistants, networks, pagers, televisions, radio receivers, telephones, and so on. A non-vehicle 24 that receives the traffic messages 22 may obtain them in the same manner as the vehicles, i.e., by broadcast. Alternatively, the non-vehicles 24 may receive the data 22 by other means, such as over telephone lines, over the Internet, via cable, and so on. The systems in the vehicles 11 or in the non-vehicles 24 that receive the traffic data 22 may include various different platforms.

Figure 2:
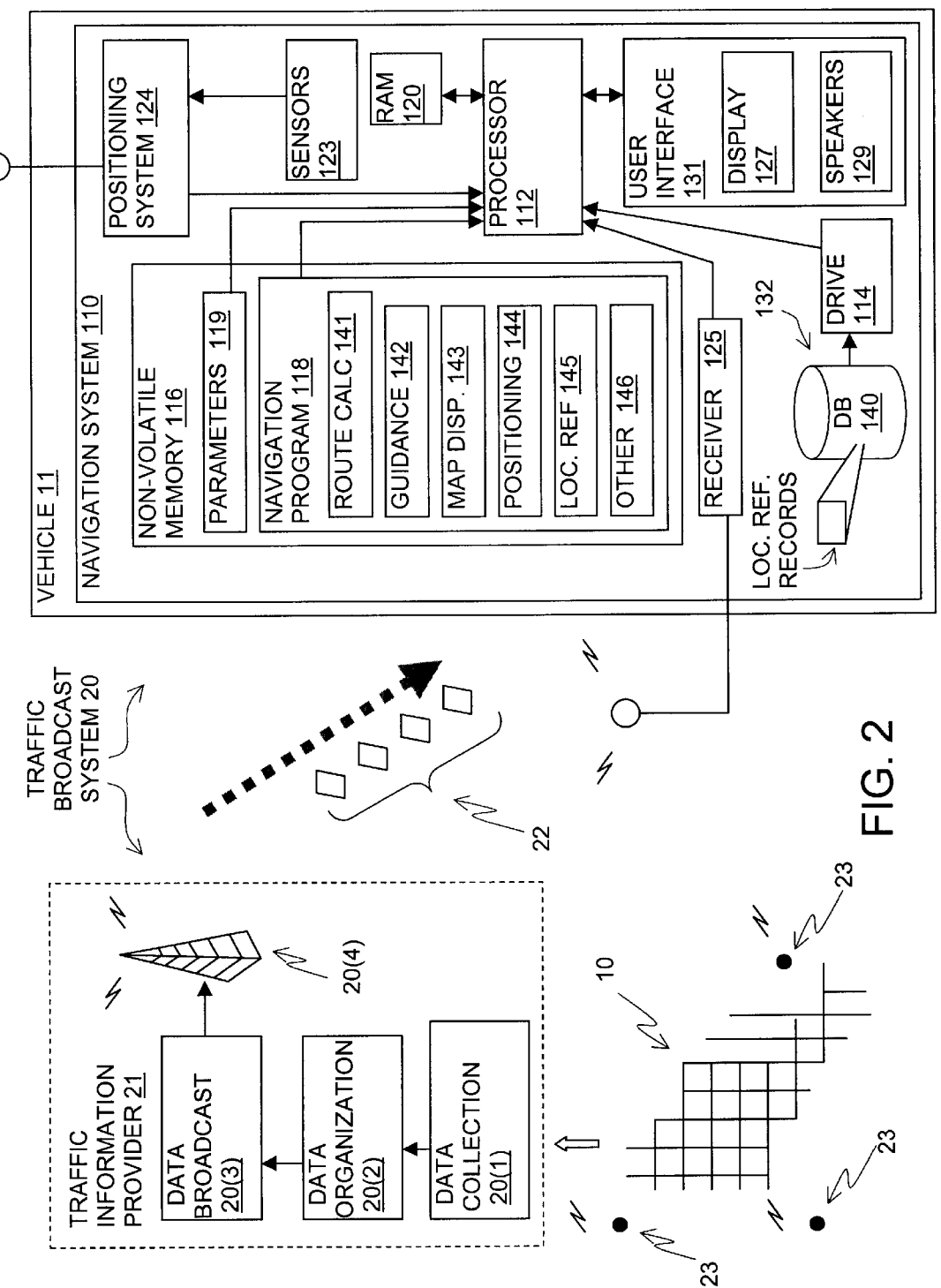
FIG. 2 is a block diagram illustrating components of the traffic broadcast system and one of the vehicles with an on-board navigation system, as shown in FIG. 1.

FIG. 2 shows diagrammatically the components of the traffic information broadcast system 20 and one of the vehicles 11 in FIG. 1. The traffic information broadcast system 20 provides for the collection of data relating to traffic and road conditions, the analysis and organization of these collected data, the formatting of the analyzed data into traffic messages, and the transmission of these traffic messages to the vehicles 11 and non-vehicles 24 in the region 10 on a regular and continuing basis.

The traffic broadcast system 20 uses various means to obtain information about traffic and road conditions. These means may include sensors 23 located in or near the roads in the road network 12, aerial sensors, sensors in vehicles 11, radar, as well as other means.

The traffic broadcast system 20 includes equipment and programming 20(1) for collecting the data relating to traffic and road conditions in the region 10 from the various sensors. This equipment and programming 20(1) include, for example, various communications links (including wireless links), receivers, data storage devices, programming that saves the collected data, programming that logs data collection times and locations, and so on. The traffic broadcast system 20 includes equipment and programming 20(2) for assembling, organizing, analyzing and formatting the collected traffic and road condition data. This programming and equipment 20(2) include storage devices, programming that statistically analyzes the collected data for potential errors, programming that organizes the collected data, programming that uses the data to prepare messages in one or more appropriate predetermined formats. The traffic broadcast system 20 also includes suitable equipment and programming 20(3) for broadcasting the data messages. The equipment and programming 20(3) include interfaces to transmitters, programming that communicates formatted messages at regular intervals to the transmitters, and so on. The traffic broadcast system 20 also includes transmission equipment 20(4). This equipment 20(4) may comprise one or more FM transmitters, including antennas, or other wireless transmitters. This equipment 20(4) provides for broadcasting the formatted traffic and road condition data messages 22 throughout the region 10. The broadcasting equipment 20(4) may be part of the traffic broadcast system 20, or alternatively, the broadcast system 20(4) may use equipment from other types of systems, such as cellular or paging systems, FM radio stations, and so on, to broadcast traffic data messages 22 to the vehicles 11 and non-vehicles 24 in the region. (For purposes of this disclosure and the appended claims, the broadcasting of traffic messages is intended to include any form of transmission, including direct wireless transmission.)

Vehicles 11 and non-vehicles 24 in the region 10 have appropriate equipment that can receive these traffic messages 22.

Figure 3:
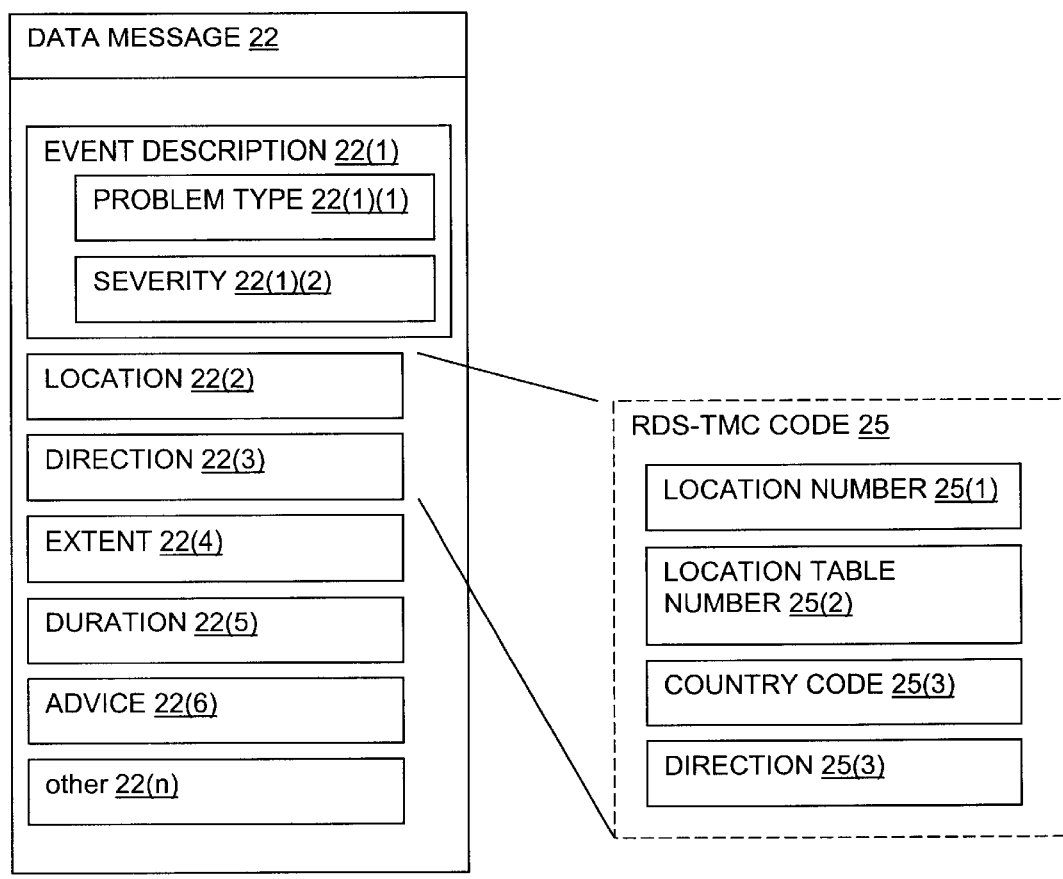
FIG. 3 is a diagram illustrating data components included in one of the traffic messages shown in FIG. 2.

FIG. 3 illustrates the data components of one of the traffic messages 22. The traffic message 22 can include various kinds of information. One useful kind of information that the traffic message 22 can include relates to traffic congestion. When used to provide information about traffic congestion, the traffic message 22 includes data components that identify one or more locations along a road that are congested, how bad the congestion is, and how far the congestion extends.

In the embodiment shown in FIG. 3, the traffic message 22 includes the following data components: an event description 22(1), a location 22(2), a direction 22(3), an extent 22(4), a duration 22(5) and advice 22(6). In alternative embodiments, the traffic message 22 may also include components that provide other information 22(n).

The event description component 22(1) includes data that describe a traffic problem 22(1)(1) along with data that describe a level of severity 22(1)(2) of the traffic problem 22(1)(1).

The location component 22(2) includes a reference number that identifies the location (e.g., a primary location) of the traffic problem 22(1)(1).

The direction component 22(3) includes data that indicate the direction of traffic affected.

The extent component 22(4) includes data that identify a length of a traffic congestion queue with respect to the location 22(2). The extent component 22(4) implicitly defines another location (e.g., a secondary location) straddling the traffic condition in terms of the number of location references in between.

The advice component 22(6) provides a recommendation for a diversion of route.

According to one embodiment, the traffic message 22 conforms to the standard format for ALERT-C messages established in the RDS-TMC system. For example, in the RDS-TMC system, the location 22(2) portion of the message 22 includes a RDS-TMC code 25. The RDS-TMC code 25 includes a location number 25(1), a location table number 25(2), a country code 25(3), and a direction 25(4). The location number 25(1) is a unique number within a region to which one location table (i.e., a database of numbers) corresponds. The location table number 25(2) is a unique number assigned to each separate location table. The country code 25(3) is a number that identifies the country in which the location referenced by the location number 25(1) is located. The direction 25(4) takes into account factors such as bi-directionality and whether or not the segments are external to the junction. The RDS-TMC code 25 is published in the message 22 in a string as follows:

| ABCCDEEEEE |
| --- |
| where: |
| A: Direction of the road segment (= direction 25(4)) |
| B: Country code (= country code 25(3)) |
| CC: Location database number (= location table number 25(2)) |
| D: RDS direction (+, −, P, N) (= direction 25(4)) |
| EEEEE: Location code (= location number 25(1)) |

By convention, the location portion 22(2) of a message 22 specifies the location at which a traffic queue begins. This location may be referred to as the primary location or the head. The message 22 also indicates a secondary location or tail. The message 22 indicates the secondary location indirectly, i.e., by means of the direction and extent 22(4). The extent 22(4) indicates how many location codes from the primary location are affected at the level of severity (i.e., 22(1)(2)) indicated in the message.

Location codes refer to specific locations that are spaced apart from each other along a road. Therefore, when using location codes to specify a primary location (i.e., the location at which traffic congestion begins), the exact location at which traffic congestion begins may be between the locations to which location codes are assigned. In this case, by convention, the location code assigned to the location immediately beyond the traffic incident is used to specify the primary location.

Figure 4:
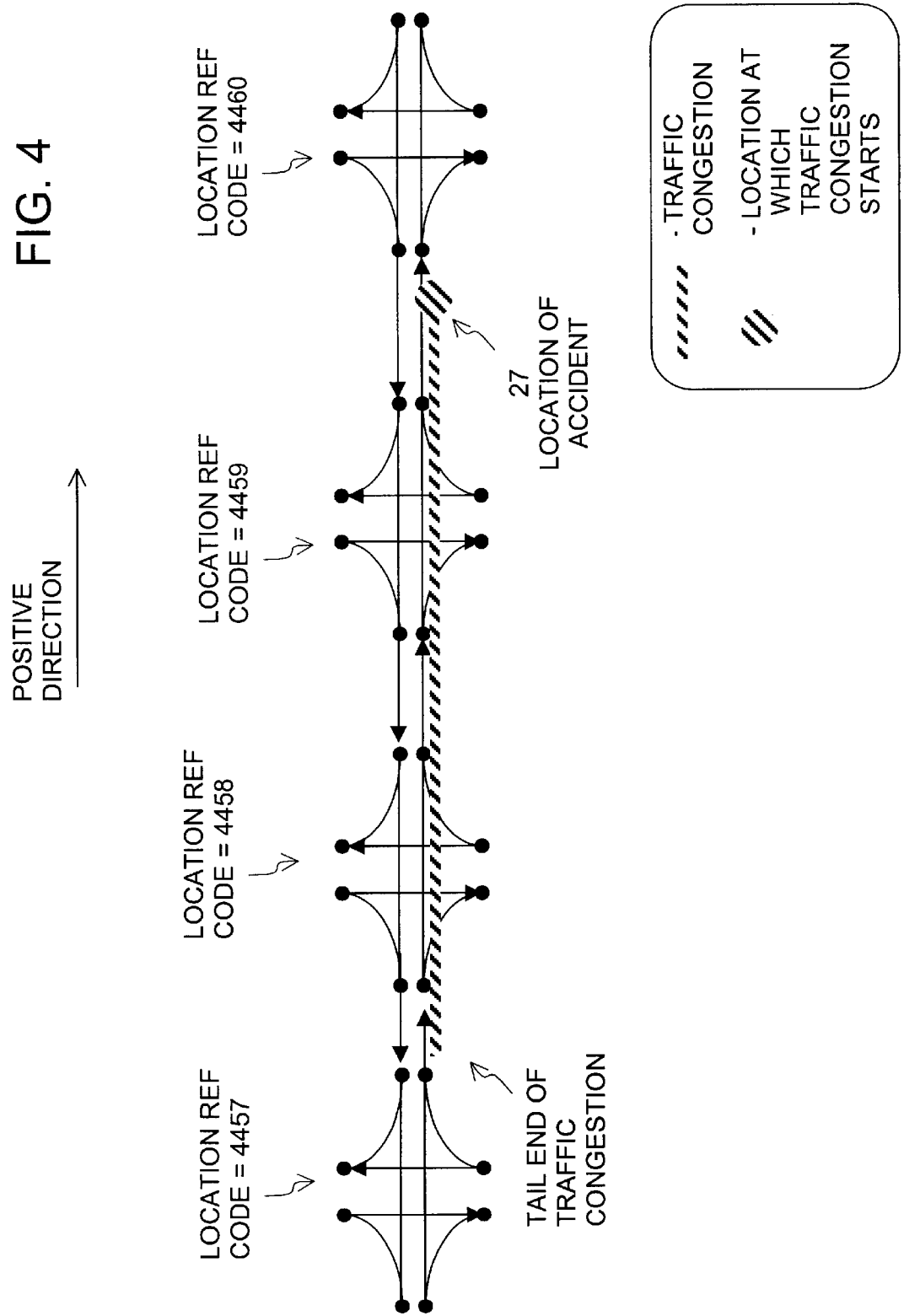
FIG. 4 is a diagram that illustrates how traffic congestion is represented using the data message format of FIG. 3.

FIG. 4 illustrates how traffic congestion is reported using this type of data message format. In this example, a traffic jam occurs on this road at 27 due to an accident. The primary location is Junction 4460 and the secondary location is 4457. The direction is negative and the extent of the traffic jam is 3. This means that the Junctions 4459, 4458 and 4457 are affected.

II. In-Vehicle Navigation System—Overview

Referring again to FIG. 2, installed in the vehicle 11 is a navigation system 110. The navigation system 110 is a combination of hardware and software components. In one embodiment, the navigation system 110 includes a processor 112, a drive 114 connected to the processor 112, and a non-volatile memory storage device 116 for storing navigation application software programs 118 and possibly other information. The processor 112 may be of any type used in navigation systems.

The navigation system 110 may also include a positioning system 124. The positioning system 124 may utilize GPS-type technology, a dead reckoning-type system, or combinations of these, or other systems, all of which are known in the art. The positioning system 124 may include suitable sensing devices 123 that measure the traveling distance speed, direction, and so on, of the vehicle. The positioning system 124 may also include appropriate technology to obtain a GPS signal, in a manner which is known in the art. The positioning system 124 outputs a signal to the processor 112. The signal from the positioning system 124 may be used by the navigation application software 118 that is run on the processor 112 to determine the location, direction, speed, etc., of the vehicle 11.

The vehicle 11 includes a traffic message receiver 125. The receiver 125 may be an FM receiver tuned to the appropriate frequency used by the traffic broadcast system 20 to broadcast the traffic messages 22. The receiver 125 receives the traffic messages 22 from the traffic data provider 21. (In an alternative in which the traffic messages are sent by a direct wireless transmission, such as via a cellular wireless transmission, the receiver 125 in the vehicle 11 may be similar or identical to a cellular telephone.) The receiver 125 provides an output to the processor 112 so that appropriate programming in the navigation system 110 can utilize the data broadcast by the traffic broadcast system 20 when performing navigation functions, as described more fully below.

The navigation system 110 also includes a user interface 131. The user interface 131 includes appropriate equipment that allows the end user (e.g., the driver or passengers) to input information into the navigation system. This input information may include a request to use the navigation features of the navigation system. For example, the input information may include a request for a route to a desired destination. The input information may also include requests for other kinds of information. The user interface equipment used to input information into the navigation system 110 may include a keypad, a keyboard, a microphone, etc., as well as appropriate software, such as a voice recognition program. The user interface 131 also includes suitable equipment that provides information back to the end user. This equipment may include a display 127, speakers 129, or other means.

The navigation system 110 uses a geographic database 140 stored on a storage medium 132. In this embodiment, the storage medium 132 is installed in the drive 114 so that the geographic database 140 can be read and used by the navigation system. The storage medium 132 may be removable and replaceable so that a storage medium with an appropriate geographic database for the geographic region in which the vehicle is traveling can be used. In addition, the storage medium 132 may be replaceable so that the geographic database 140 on it can be updated easily. In one embodiment, the geographic data 140 may be a geographic database published by Navigation Technologies of Chicago, Ill.

In one embodiment, the storage medium 132 is a CD-ROM disk. In an alternative embodiment, the storage medium 132 may be a PCMCIA card in which case the drive 114 would be substituted with a PCMCIA slot. Various other storage media may be used, including fixed or hard disks, DVD disks, or other currently available storage media, as well as storage media that may be developed in the future. The storage medium 132 and the geographic database 140 do not have to be physically provided at the location of the navigation system. In alternative embodiments, the storage medium 132, upon which some or all of the geographic data 140 are stored, may be located remotely from the rest of the navigation system and portions of the geographic data provided via a communications link, as needed.

In one exemplary type of system, the navigation application software program 118 is loaded from the non-volatile memory 116 into a RAM 120 associated with the processor 112 in order to operate the navigation system. The processor 112 also receives input from the user interface 131. The input may include a request for navigation information. The navigation system 110 uses the geographic database 140 stored on the storage medium 132, possibly in conjunction with the outputs from the positioning system 124 and the receiver 125, to provide various navigation features and functions. The navigation application software program 118 may include separate applications (or subprograms) that provide these various navigation features and functions. These functions and features may include route calculation 141 (wherein a route to a destination identified by the end-user is determined), route guidance 142 (wherein detailed directions are provided for reaching a desired destination), map display 143, and vehicle positioning 144 (e.g., map matching). Also included in the programming 118 on the navigation system is location referencing programming 145, which is explained in more detail below. Other functions and programming 146 may be included in the navigation system 110. The navigation application program 118 may be written in a suitable computer programming language such as C, although other programming languages, such as C++ or Java, are also suitable.

All of the components described above may be conventional (or other than conventional) and the manufacture and use of these components are known to those of skill in the art.

III. Coordination of Traffic Messages With Geographic Database

In EP 1 004 852 A2, a method and system are disclosed that facilitate using data contained in traffic messages that are broadcast by a traffic broadcast system in navigation systems that also use geographic databases. Using data from broadcast traffic messages together with a geographic database allows a navigation system to provide improved navigation-related features to a driver. In addition, using data from broadcast traffic messages together with a geographic database allows a navigation system to provide navigation features that had previously been unavailable. One advantage of using data from traffic broadcast messages together with a geographic database is that route calculation by the navigation system can take into account up-to-the-minute traffic conditions when determining a route to a desired destination.

According to EP 1 004 852 A2, location reference data records are used to identify certain segment data records in the geographic database as being associated with certain location reference numbers. These location reference data records may be included in the geographic database 140 or may be provided to vehicle navigation systems via a wireless communication link. According to another aspect of the system disclosed in EP 1 004 852 A2, data are formed, stored and used to identify, for each location reference number, the immediately previous and the immediately next location reference number. This allows the "extent" data in a broadcast message to be interpreted and related to records in the geographic database. According to still another aspect of system disclosed in EP 1 004 852 A2, programming is included in the navigation system that queries the geographic database and returns the data entities associated with certain identified location reference numbers. Each of these aspects is described in detail in EP 1 004 852 A2.

The subject matter disclosed in EP 1 004 852 A2 provides advantages for users of in-vehicle navigation systems by allowing these users to use broadcast traffic information in their vehicle navigation systems. As mentioned above, a factor to be considered is that there may be more than one location reference code system in use in a geographic region. These different location reference code systems may be established by different entities, such as different companies or government agencies. These different location reference code systems may represent the roads differently. For example, in these different location reference systems, location reference codes may not be assigned to the same locations. Furthermore, in these different location reference systems, different location reference codes may be assigned to the same locations. These differences make the different location reference systems incompatible with each other. This incompatibility has the result that a user whose system is designed to receive traffic messages that use the location reference codes assigned by one entity cannot use traffic messages that use the location reference codes assigned by another entity.

Embodiments described below provide ways for users of systems that support location reference codes assigned by a first data supplier to obtain and use traffic message information that was developed using location reference codes assigned by second data supplier.

IV. Support for Different Location Reference Code Systems

A. Definitions

The following definitions are used.

1. "On Road" name. The "On Road" name refers to the name of a road along which location reference codes have been assigned in the location tables from different sources. For example, in the location reference code table from data supplier A (i.e., a first data source), the name of a road is contained in the "Road Number" and "Road Name" fields, but in the location reference code table from data supplier B (i.e., second data source), the name of a road is contained in the "Name" field. The "On Road" name can be used to identify common roads to which location reference codes have been assigned by different data suppliers. Identification of common roads to which location reference codes have been assigned by different data suppliers enables the location reference codes that refer to these common roads in the location tables from the different data suppliers to be identified.

2. "Cross Road" name. The "Cross Road" name refers to the name of a crossroad at the location along a road, i.e., an "On Road", to which a location reference code has been assigned. In the location table from data supplier A, the name of the crossroad may be contained in the "first name" field and in the location table from data supplier B, the name of the crossroad may be contained in the "Xstreet" field.

3. "Bi-Directional codes." "Bi-directional codes" refer to codes in a location reference table in which the same codes are used for both directions of travel on a single road.

4. "Uni-directional codes." "Uni-directional codes" refer to codes in a location reference table in which the different codes are used for each direction of traffic on a single road 5. "NEXT Location." "NEXT Location" identifies, with respect to a given location reference code along a road, the immediate next location reference code along the road in a predetermined direction. In the location table from data supplier A, the "NEXT Location code" maybe contained in the "Positive Offset" field and in the location table from data supplier B, the "NEXT Location code" may be contained in the "NextID" field. (The "NextID" field is only one possible name for an item of data associated with a location reference code in the location reference code table from a data source that identifies the immediately next location reference code relative thereto. Other names for this item of data may be used by different data suppliers.)

6. "PREV Location." "PREV Location" identifies, with respect to a given location reference code along a road, the immediate previous location reference code along the same road in a predetermined direction. In the location table from data supplier A, the "PREV Location code" is contained in the "Negative Offset" field and in the location table from data supplier B, the "PREV Location code" is contained in the "PrevID" field. (The "PrevID" field is only one possible name for an item of data associated with a location reference code in the location reference code table from a data source that identifies the immediately prior location reference code relative thereto. Other names for this item of data may be used by different data suppliers.)

7. "Positive Direction." "Positive Direction" refers to a predetermined direction along a road. In the location table from data supplier A, the "Positive Direction" is the direction of the location reference code specified by the "Positive Offset" and in the location table from data supplier B, the "Positive Direction" is the direction of the location reference code specified by the "NextiD" field.

8. "Negative Direction." The "Negative Direction" refers to a predetermined direction along a road. In the location table from data supplier A, the "Negative Direction" is the direction of the location reference code specified by the "Negative Offset" and in the location table from data supplier A, the "Negative Direction" is the direction of the location reference code specified by the "PrevID" field.

9. "Traffic Flow direction." For a specified location reference code and direction (i.e., Positive Direction or Negative Direction), the direction that vehicles travel that corresponds thereto. The values are either (1) "towards the NEXT location/away from the PREV Location" or (2) "away from the NEXT location/towards the PREV Location."

10. "Exact Match." An "Exact Match" refers to a location in the table from either data supplier that is matched to a specific location in the table from the other source.

11. "Intermediate Match." An "Intermediate Match" refers to a location in a table from one data supplier that is not matched to a specific location in the table from the other data supplier, but is topologically located (via one or more NEXT Locations and PREV Locations) between two matched (i.e., Exact Match) locations in the table.

12. "Dangling Match." A "Dangling Match" refers to a location in a table from one data supplier that is not matched to a specific location in the table from the other data supplier, but is topologically located (via one or more NEXT Locations or PREV Locations) before or after a matched location in the table from the one source. (A Dangling Match and an Intermediate Match are exclusive, i.e., if a match can be an Intermediate Match, it is not a Dangling Match.)

B. Overview

Figure 5:
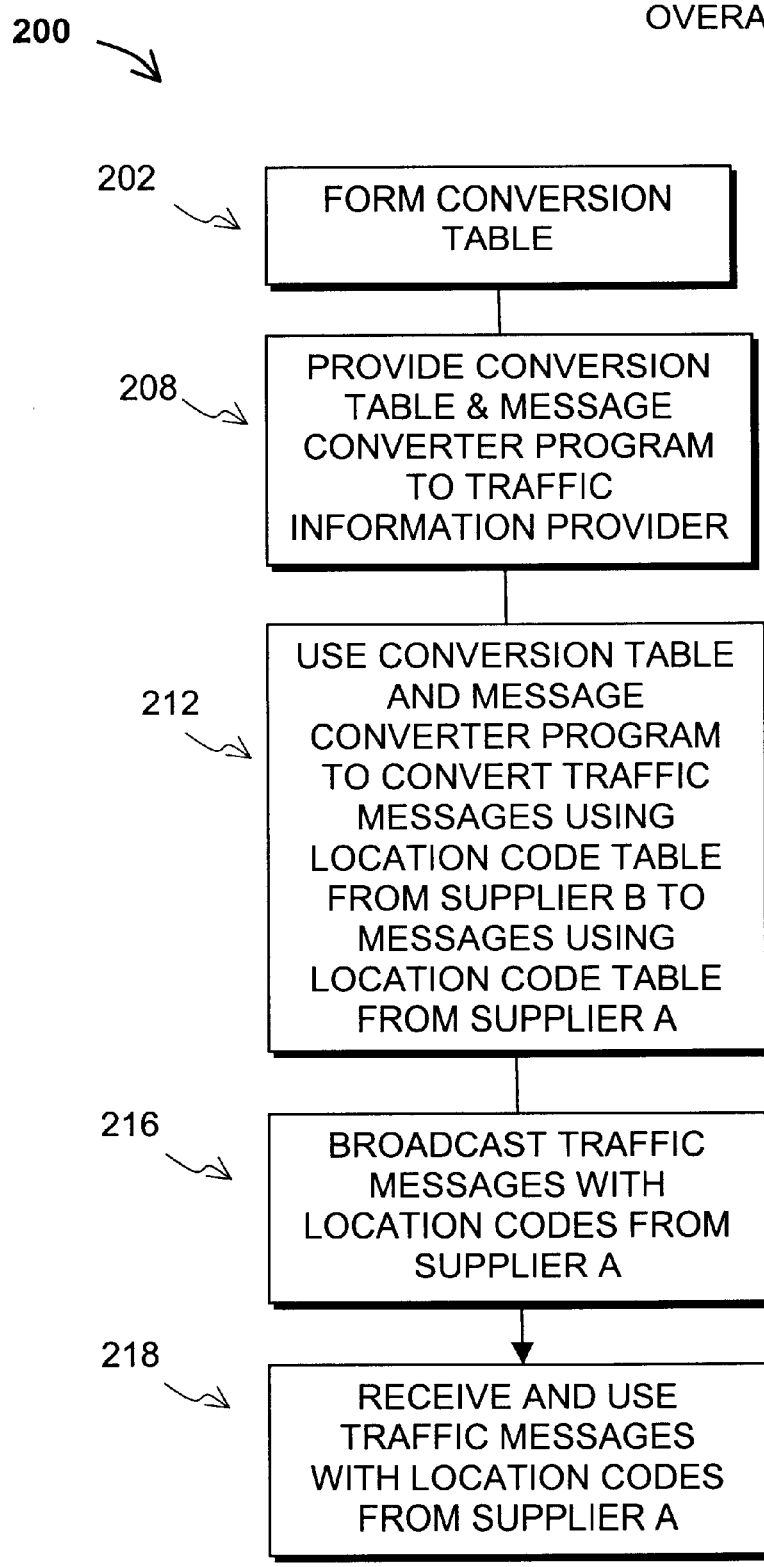
FIG. 5 shows an overall process that enables traffic messages that have been prepared using a set of location reference codes assigned by one entity to be to converted and used in navigation systems that use geographic data that support a different set of location reference codes assigned by another entity.

FIG. 5 shows parts of an overall process 200 that enables traffic messages that have been prepared using a set of location reference codes assigned by one entity (i.e., referred to as the "second data source" or "data supplier B") to be to converted, sent and used in systems (such as navigation systems) that use geographic data that support a different set of location reference codes assigned by another entity (also referred to as the "first data source" or "data supplier A"). In a first part of the process 200, a conversion table (or other suitable data structure) is formed (Step 202). Then, the conversion table and a message converter program are provided to the traffic information provider or other entity (Step 208). Then, the traffic information provider uses the conversion table and the message converter program to convert traffic data messages that have been prepared using the location reference codes assigned by data supplier B into traffic data messages that include location reference codes that have been assigned by data supplier A (Step 212). The traffic information provider then broadcasts the traffic data messages that now include the location reference codes assigned by data supplier A (Step 216). The traffic data messages containing the location reference codes assigned by data supplier A are received and used by end users in their navigation systems (Step 218). Parts of the process 200 are explained in more detail below.

Figure 6:
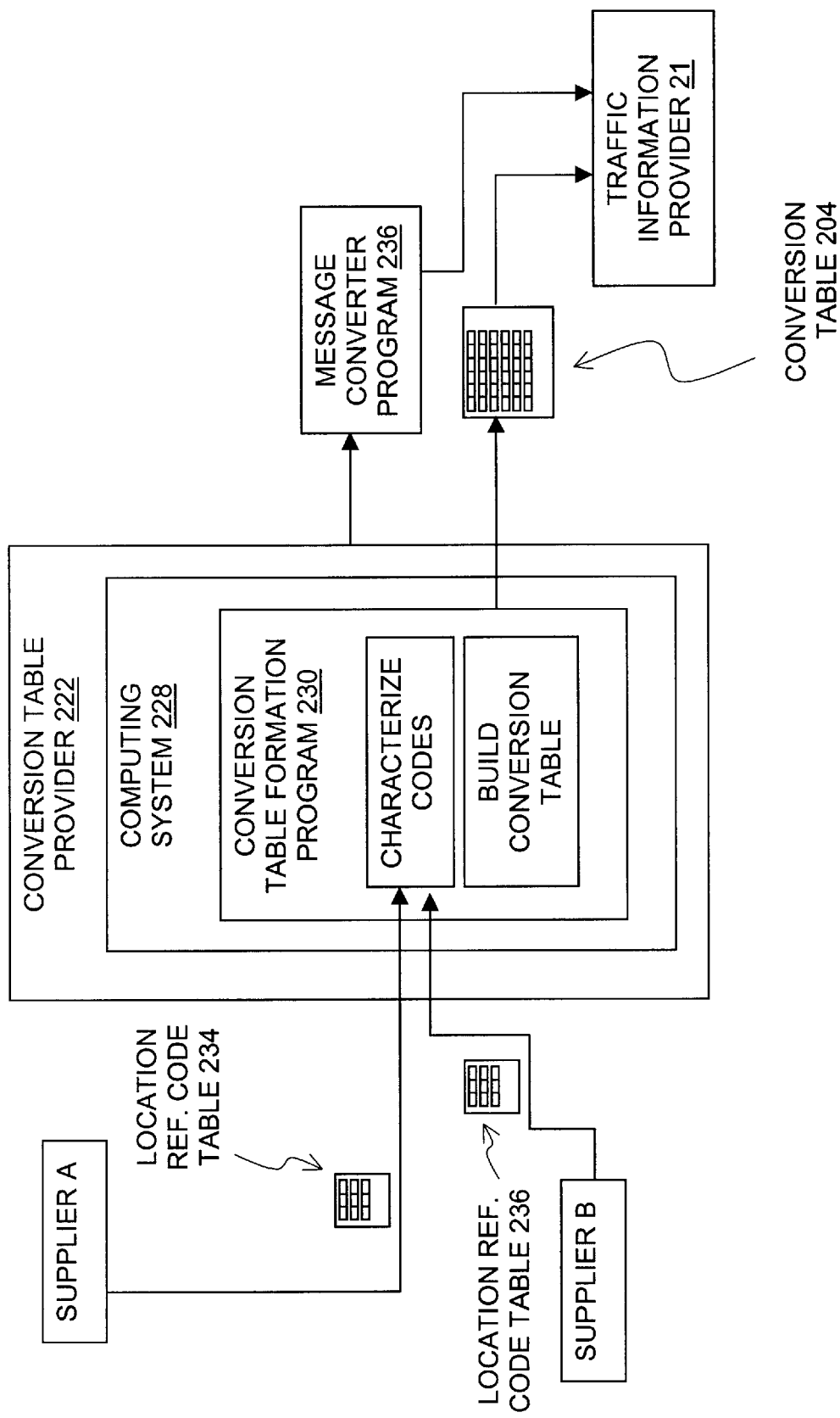
FIG. 6 is a block diagram showing parts of the process of FIG. 5.

FIG. 6 is a diagram that shows formation of a conversion table 204 (i.e., step 202 in FIG. 4). A conversion table provider 222 receives a first location reference code table 234 that contains location reference codes assigned by data supplier A and a second location reference code table 236 that contains location reference codes assigned by data supplier B. The conversion table provider 222 operates a conversion table formation program 230. The conversion table formation program 230 is a software program that runs on a computing system 228 operated by the conversion table provider 222. In one embodiment, the conversion table program 230 is written in the Java programming language and run on a personal computer. Other programming languages and other types of computers are also suitable and may be used.

The conversion table formation program 230 provides two functions. First, by comparing the location reference code tables that contain the location reference codes assigned by data supplier A and data supplier B, each code in each table is characterized as a match type. Then, using the match type associated with each code, the conversion table 204 is built.

C. Formation of the Conversion Table

Figure 7A:
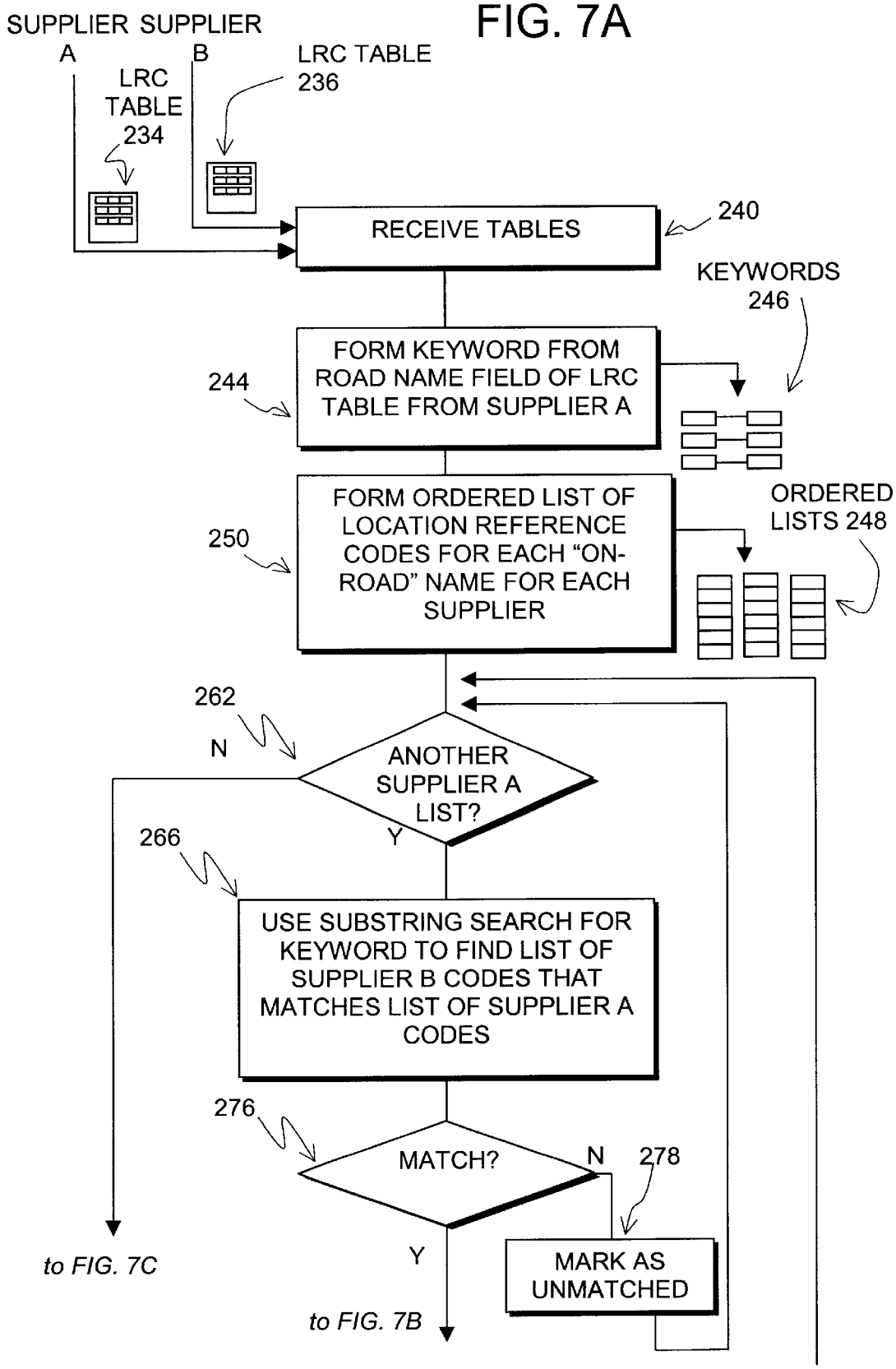
FIGS. 7A–7C show a flowchart of the process performed by the data conversion table formation program of FIG. 6.
Figure 7B:
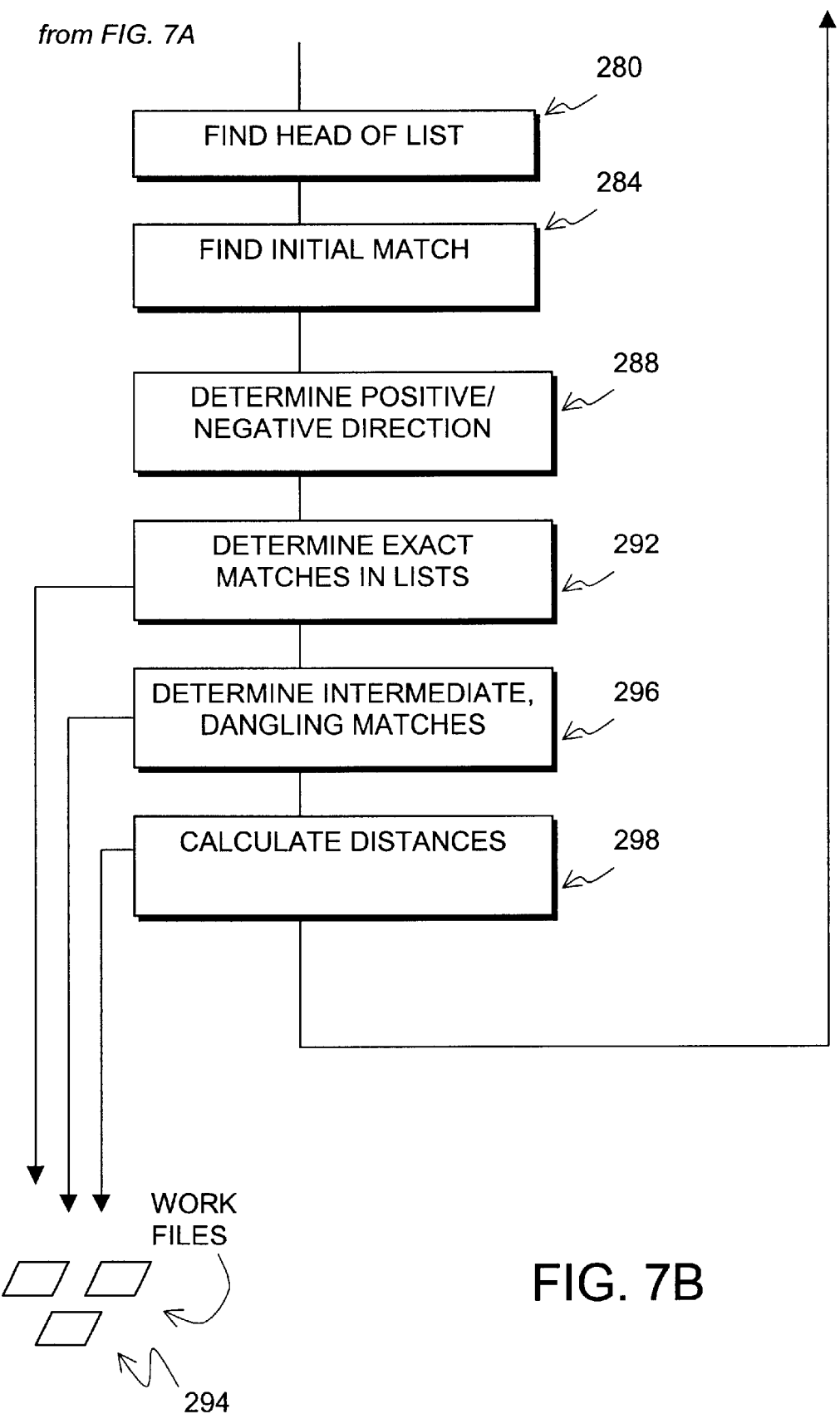
Figure 7C:
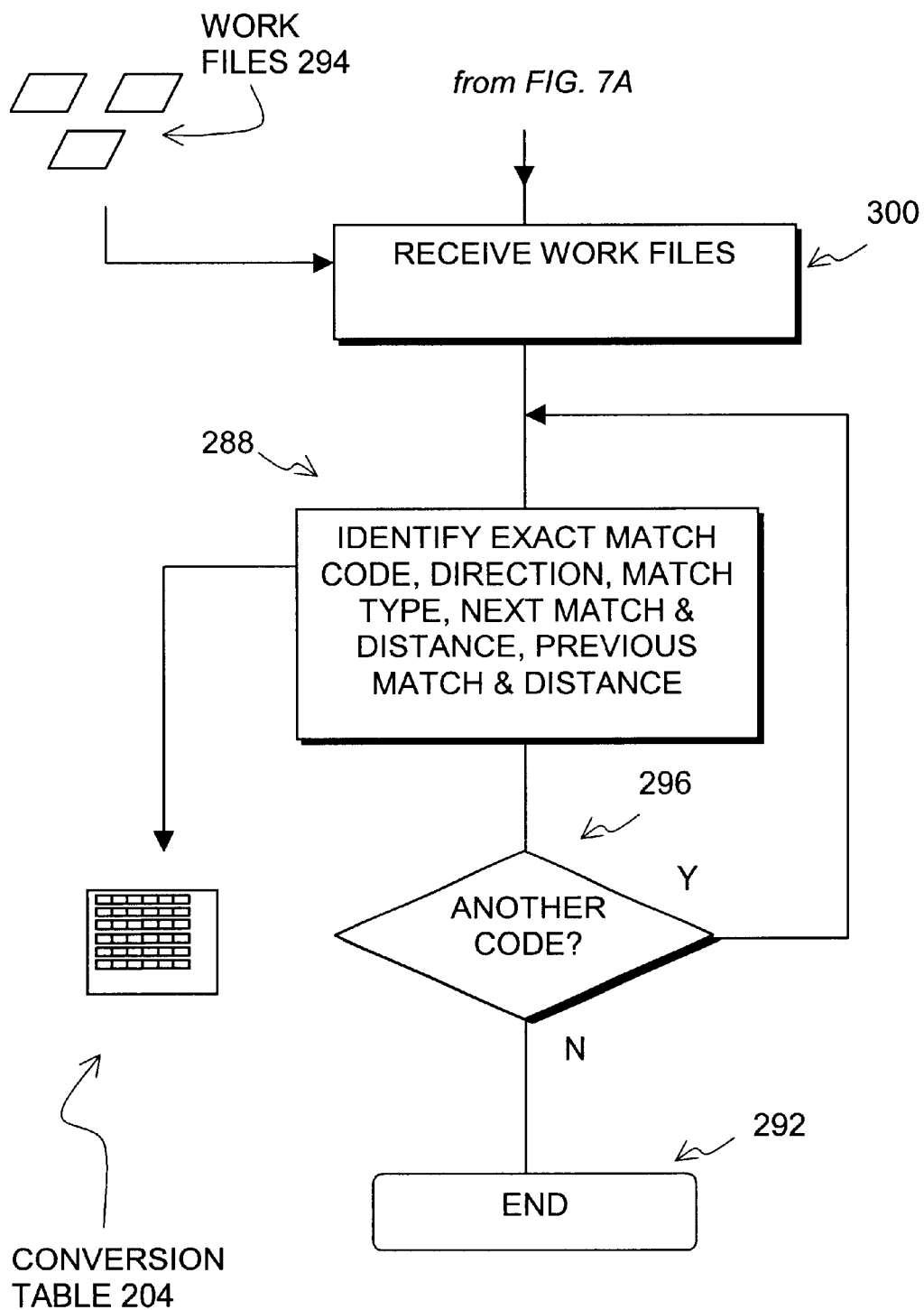

FIGS. 7A–7C show steps performed by the conversion table formation program (230 in FIG. 6). Referring to FIG. 7A, the conversion table formation program 230 receives the first location reference code table 234 and the second location reference code table 236 (Step 240). As mentioned above, the first location reference code table 234 has location reference codes that have been assigned by data supplier A and the second location reference code table 236 has location reference codes that have been assigned by data supplier B.

In this embodiment, the location reference code table 234 from data supplier A includes bi-directional location reference codes and the location reference code table 236 from data supplier B includes uni-directional location reference codes. In alternative embodiments, the location reference code table 234 from data supplier A may include unidirectional location reference codes and the location reference code table 236 from data supplier B may include bi-directional location reference codes. In further alternative embodiments, both the location reference code table 234 from data supplier A and the location reference code table 236 from data supplier B may include uni-directional location reference codes or both the location reference code table 234 from data supplier A and the location reference code table 236 from data supplier B may include bi-directional location reference codes.

In one embodiment, the matching of road names is performed by creating keywords. The conversion table formation program 230 forms keywords 246 from the data in the road name field of the location reference code table 234 from data supplier A (Step 244). Keywords 246 include route identifiers, local names (with suffix, prefix, and street type), or exit numbers. When forming keywords 246, white spaces (e.g., blank spaces) and punctuation are eliminated.

After the formation of keywords 246, the conversion table formation program 230 creates an ordered list 248 of location reference codes for each unique road name contained in each location reference code table (Step 250). More specifically, for each unique road name contained in each of the two location reference code tables 234 and 236, a list of the location reference codes assigned to positions along that road is formed. The location reference codes in each list are ordered in the positive direction (as defined by the assigned location reference codes) with respect to the locations along the road they represent. The nextID and prevID fields or the Negative Offset and Positive Offset fields in the location reference code tables can be used for this purpose.

At this point certain types of differences between the location reference code table provided by the two data suppliers are accounted for. As an example, if data supplier B assigns location reference codes to ramps but data supplier A does not, then all the locations reference codes from supplier B that refer to ramps are eliminated because these will be no matches for any them among supplier A's codes. These steps are optional and depending on the types of differences or other factors, no adjustments may be made.

After the ordered lists 248 are formed, the conversion table formation program 230 attempts to match the lists from the two data suppliers that refer to the same roads. More specifically, starting with one of the ordered lists 248 formed from the location reference code table 234 from data supplier A, a process 266 is performed that attempts to find the ordered list 248 formed from the location reference code table 236 from data supplier B that refers to the same road. This process 266 is performed for each of the ordered lists 248 formed from the location reference code table 234 from data supplier A (Step 262).

According to one embodiment, the keywords 246 formed (in Step 244) from the road name field from the location reference code table 234 from the data supplier A is used. One or more separate keywords correspond to each list 248 formed from the location reference code table 234 from data supplier A. According to this embodiment, for each list 248 formed from the location reference code table 234 from data supplier A, the keyword corresponding to the list is used in a substring search performed in the road name field of the ordered lists 248 formed from the location reference code table 236 from data supplier B (Step 266). When making the substring match, naming conventions are considered for regular names (e.g., St Helena Street) and route number names (CA-12 vs. Highway 12). Also, street types are considered for standardization/expansion when making comparisons. When attempting to find a substring match, white spaces (e.g., blank spaces) and punctuation are ignored. Also, when attempting to find a substring match, matches of parts of words are ignored. If location data (e.g., latitude/longitude) are available in the same or similar datum (e.g., WGS84) for the location reference codes of both data suppliers, the locations are compared to confirm that they are within a threshold distance.

If the substring search fails to find a match, the ordered list 248 formed from the location reference table 234 from data supplier A is marked as unmatched (Steps 276 and 278). The conversion table formation program 230 then proceeds to another list 248 formed from the location reference code table 234 from data supplier A.

If one or more of the ordered lists 248 of location reference codes from data supplier B are found to refer to the same road as the ordered list 248 of location reference codes formed from the location reference code table from data supplier A (Step 276), the conversion table formation program 230 attempts to find the individual location reference codes in the ordered lists 248 from the two data suppliers that refer to the same locations. In performing this step, the conversion table formation program 230 attempts to find an initial matching location to which codes from the ordered lists 248 from the two data suppliers refer.

Referring to FIG. 7B, the conversion table formation program 230 starts with the first location reference code in the ordered list 248 of location reference codes from data supplier A (Step 280). The location code conversion program 230 attempts to match the 'cross road name' associated with this first data supplier A code to any 'cross road' name' in the ordered list 248 of data supplier B codes that have been found refer to the same road (Step 284). According to this embodiment, keywords are formed from the 'cross road name' field in the location reference code table from data supplier A. (The 'cross road name' keyword may be formed in a similar or identical manner as the 'road name' keyword, described above.) The keyword formed from the 'cross road name' from the location reference code from data supplier A is used in a substring search performed in the cross road name fields of the location reference codes contained in the ordered list 248 formed from the location reference code table 236 from data supplier B that refer to the same road. As before, when attempting to find a substring match, white spaces (e.g., blank spaces) and punctuation are ignored. Location data (e.g., latitude/longitude) associated with the location reference codes from the two data suppliers are compared to confirm that the represented locations are within a threshold distance. Similarly, if 'city name' data is associated with the location reference codes from each data supplier, the 'city name' data are compared to determine if the locations reference codes refer to the same location. If 'city name' data from the two data suppliers are compared, naming conventions used by the data suppliers are taken into account.

If no match is found for the first location reference code in the ordered list 248 of data supplier A location reference codes, the conversion table formation program 230 attempts to find a match for one or more subsequent location reference codes in the ordered list 248 of data supplier A location reference codes. Subsequent location reference codes from the ordered list of data supplier A codes are examined until a matching location in the ordered list of data supplier B codes is found or until a predetermined number (or the entire list) of subsequent codes in the ordered list of data supplier A codes have been examined.

Once an initial match has been found, a determination is made whether the list of data supplier B codes is ordered in the same or the opposite direction as the list of data supplier A codes (Step 288). As mentioned above, in this embodiment, the location reference codes from data supplier A are bi-directional and the location reference codes from data supplier B are uni-directional. As a result, there are two ordered lists 248 (i.e., one for each direction) of data supplier B location reference codes that correspond to one ordered list 248 of data supplier A location reference codes. The conversion table formation program 230 includes steps that determine whether the location reference codes in the ordered list 248 of data supplier B codes are ordered in the same direction as the location reference codes in the ordered list 248 of data supplier A codes. In this embodiment, this determination is made by finding a second pair of matching location reference codes. That is, after having found an initial pair of location reference codes from the two data suppliers that refer to the same location, another pair of location reference codes from the two data suppliers are found that refer to another same location. In this embodiment, this second pair of matching location reference codes is found by performing a bi-directional window match. The bi-directional window match finds the next codes from the two ordered lists of codes from the two data suppliers that refer to the same location. Once these two codes are found, it can be determined whether the ordered list of codes formed from the uni-directional location reference code table from data supplier B is ordered in the same or in the opposite direction as the ordered list of codes formed from the bi-directional location reference code table from data supplier A.

The bi-directional window match is performed as follows. After the initial matching location from the two lists has been found (in Step 284), the next code in the ordered list 248 formed from the location reference code table from data supplier A is compared to the next location in the ordered list 248 formed from the location reference code table from data supplier B. When performing this comparison, a determination is made whether these codes refer to the same location. When making this determination, the name of the cross street associated with the code in the ordered list of data supplier A codes is compared to the name of the cross street associated with the code in the ordered list of data supplier B codes to determine whether they match. As described above, a keyword formed from the cross road street name associated with the data supplier A code can be used in a sub-string search performed on the cross road street name associated with the data supplier B code.

If this comparison yields a match, the codes from the two ordered lists have been determined to refer to the same location.

However, if this comparison does not yield a match, one or more additional locations reference codes from the ordered list of codes from data supplier B are examined to find a match to the location code from data supplier A. Specifically, proceeding first in the positive direction in the list of codes from data supplier B, the cross street name associated with the next code from data supplier B is compared to the cross street name from the same code from data supplier A (i.e., using the keyword formed from the cross street name from the code from data supplier A in a sub-string search of the cross street name from the code from data supplier B). If these cross street names match, the codes from data supplier A and data supplier B are determined to refer to the same location. Otherwise, the next code (in the positive direction) in the list of data supplier B codes is examined, and so on, up to a predetermined number (such as three) of codes, until a matching location is found. If a matching location is not found after having examined the predetermined number of data supplier B codes in the positive direction, data supplier B codes in the negative direction (up to the predetermined number of) are examined until a match is found.

If a match for the code from data supplier A is not found after having searched in both the positive and negative directions in the list of data supplier B codes, an attempt is made to find a match for the next code in the positive direction in the list of data supplier A codes. As with the prior data supplier A code, a bi-directional search of the list of data supplier B codes is performed to find a match. If no match is found for this data supplier A code, the next code in the list of codes from data supplier A is selected and a bi-directional search of the codes from data supplier B is performed in an attempt to find a match for the code from data supplier A. This procedure is repeated until a second location associated with a code from data supplier A is matched to a location associated with a code from data supplier B.

After having found the second pair of location reference codes from the two data suppliers that refer to a same location, the relative directions of the lists of codes from the two data suppliers can be determined. If necessary, the ordered list of second data supplier codes is sorted in reverse order so that locations to which the codes in the lists from the two data suppliers are aligned in the same direction.

After the lists from the two data suppliers are sorted in the same order, the remaining codes in the two lists are examined to identify all the codes that refer to the same locations (Step 292). The codes from the two lists that refer to the same locations are "exact matches." The data conversion table formation program 230 uses a uni-directional window match for this purpose.

The uni-directional window search is performed as follows. The uni-directional window search starts with a known pair of matching codes from the lists from the two data suppliers and is used to find the next pair of matching codes. A keyword is formed from the 'cross road name' associated with the next code in the list of data supplier A codes. This keyword is used in a sub-string search of the 'cross road name' associated with the next code in the list of data supplier B codes. (Note that this next data supplier B code refers to the next code in the order in which the list of data supplier B codes has been re-sorted, if necessary.) If the locations are determined to match, the unidirectional search is complete, and the two codes are identified as "exact matches". If the locations are determined not to match, the next location code in the list of codes from data supplier B is examined. In this embodiment, the keyword for the cross road associated with the data supplier A code is used in a substring search of the cross road field associated with the next data supplier B code. In this embodiment, up to a predetermined number of subsequent data supplier B codes are examined until a match is found.

If no match is found for a location code from data supplier A, the uni-directional window match procedure is performed using the next location code in the list of codes from data supplier A.

During the process of finding matching codes, temporary data files 294 are formed that store data that indicate the results of the process. When a location code from the list of data supplier A codes is found to match a location code from the list of data supplier B codes, data are stored that associates these codes to each other as 'exact matches.'

The string matching process that is used while building the conversion table can yield multiple matches for any given cross road and for any given 'On road'. These multiples can be false matches that should be filtered out. If location information (i.e., latitude/longitude) is available for the location reference codes from the two tables, the location information can be used to help filter out the false matches in order to find the true matching codes. Regardless of whether location information is available, the conversion table formation program 230 performs a filtering during the window process. In one embodiment, the conversion table formation program 230 breaks down the process of finding matches into stages. In a first stage, tables are generated that include all candidate matches for all locations and roads. Then, using the window search, each set of candidates is considered to determine which yields the greatest rate of matches. The set of codes for each road is evaluated in both directions and the results are compared to avoid the problem of a bad initial (i.e., "seed") match at one end.

After the exact matches are found, "intermediate matches" are determined. Each location code from data supplier A that does not match a location code from data supplier B but which represents a location between codes that are exact matches is indicated to be an 'intermediate match' to data supplier B. Each location code from data supplier A that does not match a location code from data supplier B but which represents a location before the first pair of codes that are exact matches is indicated to be dangling at the head of the list. Each location code from data supplier A that does not match a location code from data supplier B but which represents a location after the last pair of codes that are exact matches is indicated to be dangling at the tail of the list (Step 296).

Each location code from data supplier B that does not match a location code from data supplier A, but which represents a location between codes that are exact matches, is indicated to be an intermediate match to data supplier A. Each location code from data supplier B that does not match a location code from data supplier A but which represents a location before the first pair of codes that are exact matches is indicated to be dangling at the head of the list. Each location code from data supplier B that does not match a location code from data supplier A but which represents a location after the last pair of codes that are exact matches is indicated to be dangling at the tail of the list (Step 296).

For each code from data supplier B that was determined to be an intermediate match, the next matched codes in the positive and negative direction are determined and data indicating these codes are associated with the code determined to be an intermediate match. If location data are available with respect to these codes, the straight line distance between the intermediate code and the next matched codes in the positive and negative direction are determined and data indicating these distances are associated with the code determined to be an intermediate match (Step 298).

After the various types of data that characterize each location reference code have been developed, the conversion table formation program 230 proceeds to build the conversion table 204. Referring to FIG. 7C, the table building process uses the work files 294 formed during the characterizing process (Step 300). For each location reference code of data supplier B, an entry in the table is formed that includes the following information:

(1) data supplier B code
(2) the corresponding data supplier A code if an exact match
(3) the list direction (same or reverse) relative to the direction of data supplier A code;
(4) the match type (unmatched, exact, intermediate, dangling)
(5) the first matched code in the NEXT direction if the data supplier B code was determined to be an intermediate or dangling match
(6) the distance to first matched code in NEXT direction if the data supplier B code was determined to be an intermediate match
(7) the first matched code in PREV direction if the data supplier B code was determined to be an intermediate or dangling match
(8) the distance to first matched code in PREV direction if the data supplier B code was determined to be an intermediate match If data supplier A codes are bi-directional and data supplier B codes unidirectional, there will be an entry for each data supplier B code in both the positive and negative directions. If data supplier A codes and data supplier B codes are both uni-directional, then there will be an entry for each data supplier B code for either the positive or negative direction, but not both.

Another consideration that the conversion table formation program 230 accounts for is that even if a list 248 of ordered codes from one data supplier is determined to correspond to the same road as a list 248 of ordered codes from the other data supplier, the portion (i.e., the "stretch") of the road that is represented by the location reference codes contained in the list 248 of codes from one data supplier may not exactly match the stretch of road that is represented by the location reference codes contained in the list 248 of codes from the other data supplier. The conversion table formation program 230 detects these occurrences (i.e., "breaks in the chain") and start a new set of matches with a new initial (i.e. "seed") match. The conversion table formation program 230 detects chain breaks by separating the process into stages. In one embodiment, the windowing algorithm detects if there are no more matches of supplier A codes (after finding a string of at least several matches) while there are still significant number of supplier B codes in the list that need to be matched. If this occurs, a break in the chain of code is determined to be present. Then, the conversion table formation program 230 attempts to resume finding matches for the list of supplier B codes using another list of codes from supplier A. The next location after the last match is used as a new initial location (i.e., "seed"). As explained above, the windowing algorithm searches the lists in both directions. When a new starting location is determined, the location at which the break in the chain of codes can be precisely specified.

D. Using the Conversion Table

Referring again to FIG. 6, after the conversion table 204 has been formed, the conversion table provider 222 provides the conversion table 204 to the traffic information provider 21. In addition, the conversion table provider 222 provides the traffic information provider 21 with a message converter program 320. In one embodiment, the message converter program 320 is written in the Java language although other programming languages are suitable.

Figure 8:
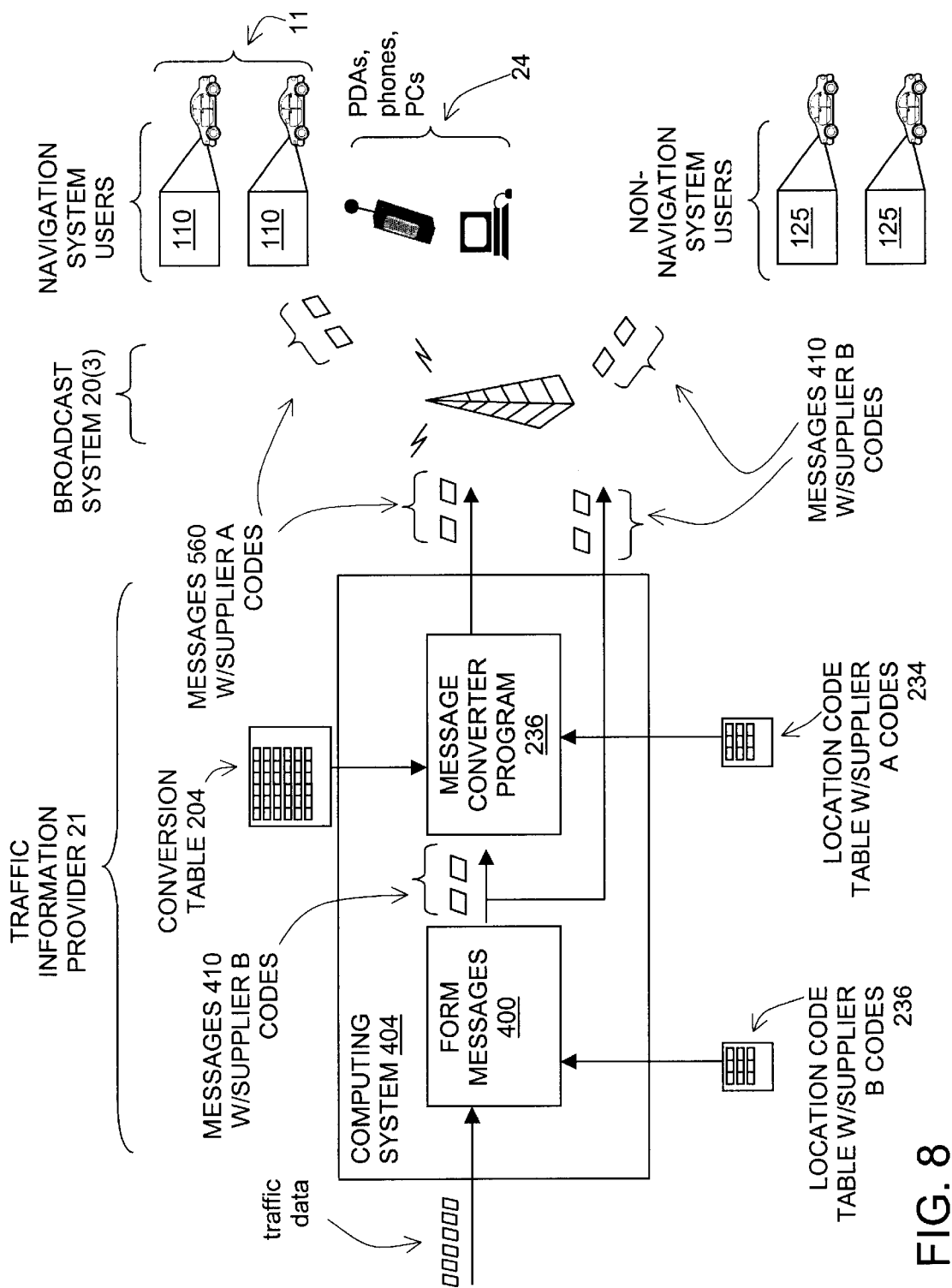
FIG. 8 is a block diagram showing further parts of the process of FIG. 5.

FIG. 8 illustrates use of the conversion table 204 and message converter program 320 by the traffic data provider 21. In FIG. 8, traffic data are received by the traffic data provider 21. The traffic data provider 21 uses a traffic message formation program 400 to form traffic data messages 410. The traffic message formation program 400 is a software program run on a computing system 404 operated by the traffic data provider 21. The traffic message formation program 400 uses the location reference table 236 that contains location reference codes assigned by data supplier B. The traffic data messages 410 formed by the traffic message formation program 400 conform to a standard format, such as the Alert-C format, as described above. The traffic data messages 410 refer to locations using the location reference table 236 that has location reference codes assigned by data supplier B.

The traffic data provider 21 also operates the message converter program 320 provided by the conversion table provider 222. The message converter program 320 is a software program that runs on a computing system operated by the traffic information provider 21. The message converter program 320 may be run on the same computing system 404 that runs the traffic message formation program 400. Alternatively, the message converter program 320 may be run on another computing system. In one embodiment, the message converter program 320 is run on a personal computer. The message converter program 320 may be run and operated by another entity, as explained below.

The message converter program 320 operates as follows. For each traffic message 410 formed by the traffic message formation program 404, the message converter program 320 extracts the components of the message (which use the location reference codes assigned by data supplier B) and uses the conversion table 204 and a set of rules to convert the components of the message into corresponding message components that use the location reference codes assigned by data supplier A. Then, the message converter program 320 forms a converted message 440 from the corresponding message components. The converted message 440 is then forwarded to the broadcast system 20(3). When performing the message conversion process, the message converter program 320 uses the location reference codes assigned by data supplier B to identify the primary and secondary locations (indicated by the location reference code for the primary location assigned by data supplier B, the direction, and the extent) and then forms a new message that uses the location reference codes assigned by data supplier A to represent the same traffic condition. The message converter program 320 takes into account that there may not be exact one-to-one correspondence between the locations reference codes assigned by the two data suppliers. Thus, when converting a traffic data message from one that uses data supplier B codes to one that uses data supplier A codes, the message converter program 320 forms a message using data supplier A codes that represents the traffic condition as closely as possible. However, in one embodiment when there is not exact correspondence between data supplier A and data supplier B location codes, the message converter program 320 uses a data supplier A location code that more conservatively represents the traffic condition. In alternative embodiments, the message converter program may apply other methods. For example, in one alternative embodiment if one location is within a near-threshold (e.g., 0.1 miles) and the other location is outside a far-threshold (e.g., 10.0) miles, the message converter program would choose the nearest. In further alternatives, other selection rules could be applied.

The data converter program 230 applies the following:

If the conversion table 204 indicates that the data supplier B code associated with the primary or secondary location has a data supplier A code which is an exact match, the data supplier B code is translated to the corresponding data supplier A code.

If the conversion table 204 indicates that the data supplier B code associated with the primary location has a data supplier A code which is an intermediate match, the data supplier B code is translated into the next data supplier A downstream in the direction of travel.

If the conversion table 204 indicates that the data supplier B code associated with the secondary location has a data supplier A code which is an intermediate match, the data supplier B code is translated into the next data supplier A upstream in the direction of travel.

An exception may occur if the distance between a supplier B intermediate location and a matched supplier A location is less than a predetermined threshold (e.g., 0.25 mile). If a data supplier B location is less than the threshold from a data supplier a location, the location code may be treated as an exact match.

Figure 9:
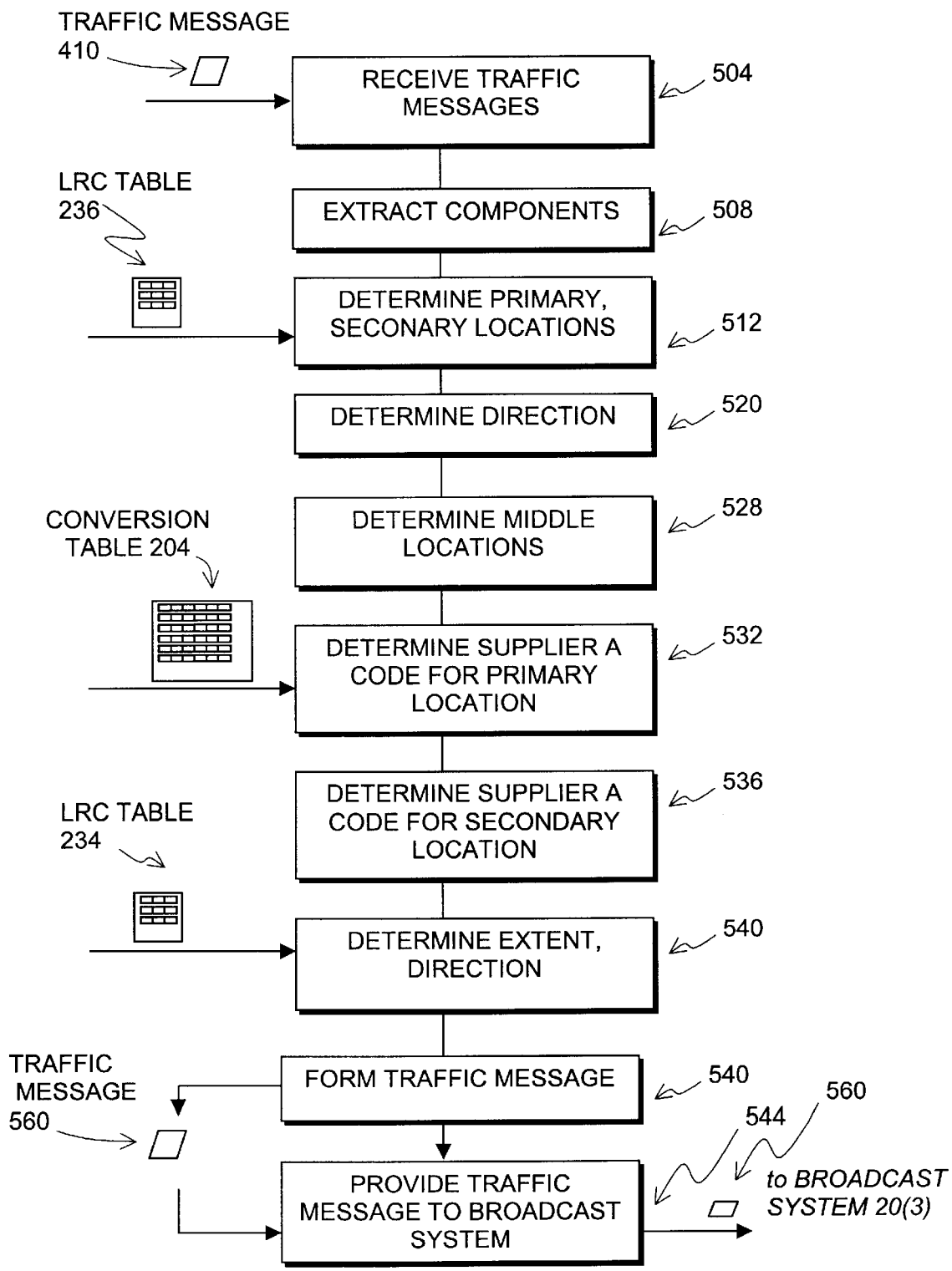
FIG. 9 shows a flowchart of the process performed by the message converter program of FIG. 8.

FIG. 9 shows steps in a process 500 performed by the message converter program 320. A traffic message 410 containing location reference codes assigned by data supplier B is received (Step 504). The components of the message 410 are extracted (Step 508). The data supplier B location codes for the primary location and secondary location are identified (Step 512). Next, the direction of the traffic message is determined using the direction information (i.e., PREV or NEXT) of the traffic message (Step 520). This is the direction from the head of the traffic problem to the tail of the traffic problem. This will be the direction specified in the Alert-C message.

Then, the message converter program 320 determines all the locations (i.e., middle locations) to which data supplier B has assigned location codes between the primary and secondary locations (Step 528).

Next, the message converter program 320 uses the conversion table 204 to determine the data supplier A location code that corresponds to the data supplier B location code for the primary location (Step 532). If the data supplier A code is an exact match to the data supplier B code for the primary location, the data supplier A code is returned and used as the code for the primary location in the converted message. If the data supplier A code is not an exact match to the data supplier B code for the primary location, the data supplier A code that represents the next downstream location is used as the code for the primary location. If the data supplier A list and the data supplier B list are in the same direction, this code will be the reverse of the direction of the traffic message, otherwise it will be the same as the direction of the traffic message. For example, if the direction of the traffic message is PREV, and the data supplier A and data supplier B lists are in the same order, the next downstream location will be the data supplier A NEXT location. If the direction of the traffic message is PREV, and the data supplier A and data supplier B lists are in reverse order, the next downstream location will be the data supplier A PREV location.

Next, the message converter program 320 uses the conversion table 204 to determine the data supplier A location code that corresponds to the data supplier B location code for the secondary location (Step 536). If the data supplier A code is an exact match to the data supplier B code for the secondary location, the data supplier A code is used for the secondary location. If the data supplier A code is not an exact match to the data supplier B code for the secondary location, the data supplier A code that represents the next upstream location is used as the code for the secondary location. If the data supplier A and data supplier B lists are in the same direction, this will be in the direction of the traffic message. If the data supplier A and data supplier B lists are in reverse order, this will be the reverse direction of the traffic. For example, if the direction of the traffic message is PREV, and the data supplier A and data supplier B lists are in the same order, the next upstream location will be the data supplier A PREV location. If the direction of the traffic message is PREV, and the data supplier A and data supplier B lists are in reverse order, the next upstream location will be the data supplier A NEXT location.

Then, the message converter program 320 uses the data supplier A location reference table 234 to determine the extent of the traffic condition in terms of data supplier A location reference codes (Step 540). Starting from the primary location, the message converter program 320 proceeds through the data supplier A location reference table 234 in the direction of the traffic message to the secondary location. The direction and the extent in terms of the data supplier A location codes are determined. After the direction and extent in terms of the data supplier A location codes has been determined, a converted message 560 can be constructed (Step 544). The converted message 560 conforms to the Alert-C format and includes information that describes the same traffic conditions as the original traffic data message 410. The converted message 560 is provided to the broadcast system 20(3) (Step 548).

Referring again to FIG. 8, the broadcast system 20(3) broadcasts the converted message 560 to users. The converted message 560, which has the location reference code assigned by data supplier A, is received by end users who have navigation systems 110 including navigation systems installed in vehicles 11 and non-vehicles 24. (Non-vehicles may include personal digital assistants, personal computers, websites, and so on.) The navigation systems 110 use geographic data that support use of location codes assigned by data supplier A. These navigation systems can use the traffic-related data contained in the message 560 according to the embodiments disclosed in EP 1 004 852 A2. The messages 560 can also be used by users who do not have navigation systems but who have receivers 125 that use the location reference codes assigned by data supplier A.

The traffic data provider 21 can broadcast both traffic messages 560 that use data supplier A codes and traffic messages 410 that use data supplier B codes. In this way, the traffic data provider 21 can reach a larger number of users.

It was mentioned above in connection with the formation of the conversion table that in some cases the stretch of a road represented by a chain of location reference codes from one supplier do not exactly match the stretch of the road represented by a chain of location reference codes from the other data supplier. When this occurs, a single chain of codes from one data supplier may correspond to (i.e., match) two or more chains of codes from the other data supplier. If a traffic message formed using the location reference codes of supplier B indicates an extent of traffic congestion that spans across more than one chain of location reference codes from supplier A, the traffic message formed using the location reference codes of supplier B will be translated into multiple traffic messages using the location reference codes of supplier A. The message converter program 236 accounts for this detecting whether the actual supplier B location reference codes indicated by the extent indicated in a traffic message code formed using the location reference codes of supplier B correspond to more than one chain of location reference codes from supplier A. If this occurs, the message converter program 236 forms multiple traffic messages using the location reference codes of data supplier A from the single traffic message formed using the location reference codes of data supplier B. When multiple messages using supplier A codes are formed from a single message formed using supplier B codes, a new primary location is determined for each additional traffic message. In addition, the extent indicated in each traffic message formed using the location reference codes of data supplier A is adjusted to correspond to the number of location reference A codes in each chain of supplier A codes that corresponds to the extent of supplier B codes indicated in the original traffic message.

V. Alternative Embodiments

In an alternative embodiment, some or all of the geographic data used by an end user's navigation system may be located remotely, with a navigation services provider for example, and accessed by the navigation system in the vehicle via a wireless communication link. For example, the location reference records used by a navigation system to associate traffic information to geographic data may be located either on a computer readable medium in the vehicle or may be located remotely and accessed via a communications link. The navigation services provider may be the same entity as the traffic provider or alternatively the navigation services provider and the traffic provider may be separate entities.

In another alternative, the process of converting the traffic data messages that use the second data supplier location reference codes may be performed by an entity other than the traffic data provider. In this alternative, the traffic data provider forwards the traffic data messages that use the second data supplier location reference codes to a separate entity. The separate entity uses the conversion table developed by the conversion table provider and the converter program to convert the traffic data messages that use the second data supplier location reference codes into traffic data messages that use the first data supplier location reference codes. In this embodiment, the separate entity then forwards the converted messages back to the traffic data provider who transmits the converted traffic data messages to end users. Alternatively, the separate entity may transmit the converted messages directly to the end users. In one alternative embodiment, the separate entity is the conversion table provider.

In an embodiment disclosed above, it was described how traffic messages using the location reference codes assigned by a second data supplier could be converted into traffic messages that use the location reference codes assigned by a first data supplier, and then transmitted to uses. In an alternative embodiment, the conversion of traffic messages could be performed by the end users' system. According to this alternative, an end user's system includes a conversion table (similar to 204 in FIG. 6) and a message converter program (similar to 236 in FIG. 8). In an embodiment disclosed above, it was stated that matching road names are determined by forming keywords. This is just one way that matching road names can be determined and it should be understood that alternative ways to match road names can be used.

It is intended that the foregoing detailed description be regarded as illustrative rather than limiting and that it is understood that the following claims including all equivalents are intended to define the scope of the invention.

We claim:

1. A method for providing traffic data to end users comprising:
   forming traffic messages using location reference codes assigned by a second data supplier;
   converting the traffic messages formed with the location reference codes assigned by the second data supplier into traffic messages formed with the location reference codes assigned by a first data supplier; and
   transmitting the traffic messages formed with the location reference codes assigned by the first data supplier to end users.

2. The method of claim 1 further comprising:
before the step of converting, forming a conversion table that identifies relationships between location reference codes assigned by the first supplier and location reference codes assigned by the second supplier; and
using the conversion table to convert the traffic messages formed with the location reference codes assigned by the second data supplier into traffic messages formed with the location reference codes assigned by a first data supplier.

3. The method of claim 1 further comprising:
in navigation systems used by the end users, using data contained in geographic databases used by the navigation systems to associate traffic data contained in the traffic messages formed with the location reference codes assigned by the first data supplier with data used to determine routes to destinations.

4. The method of claim 1 further wherein the step of converting is performed by a message converter program.

5. The method of claim 1 further comprising:
operating a message converter program to convert the location reference codes assigned by the second data supplier into traffic messages formed with the location reference codes assigned by the first data supplier.

6. The method of claim 1 further comprising:
transmitting both the traffic messages formed with the location reference codes assigned by the first data supplier and the traffic messages using the location reference codes assigned by the second data supplier to end users.

7. The method of claim 1 wherein the step of converting further comprises:
for a location reference code assigned by the second supplier that represents a location that exactly matches a location that is represented by a location reference code assigned by the first data supplier, converting the location reference code assigned by the second data supplier into the location reference code assigned by the first data supplier.

8. The method of claim 1 wherein the step of converting further comprises:
for a location reference code assigned by the second data supplier that represents a location that does not exactly match a location represented by a location reference code assigned by the first data supplier, but that represents a location located between two locations that are each represented by location reference codes assigned by both the first data supplier and the second data supplier, converting the location reference code assigned by the second data supplier into that location reference code assigned by the first data supplier that represents the location immediately downstream in the direction of traffic if the location reference code being converted represents a primary location.

9. The method of claim 1 wherein the step of converting further comprises:
for a location reference code assigned by the second data supplier that represents a location that does not exactly match a location represented by a location reference code assigned by the first data supplier, but that represents a location located between two locations that are each represented by location reference codes assigned by both the first data supplier and the second data supplier, converting the location reference code assigned by the second data supplier into that location reference code assigned by the first data supplier that represents the location immediately downstream in the direction of traffic if the location reference code being converted represents a secondary location.

10. The method of claim 1 wherein the traffic messages are in Alert-C format.

11. The method of claim 1 wherein the location reference codes assigned by the first data supplier are bi-directional.

12. The method of claim 1 wherein the location reference codes assigned by the second data supplier are uni-directional.

13. The method of claim 1 wherein the location reference codes assigned by the first data supplier are bi-directional and the location reference codes assigned by the second data supplier are uni-directional.

14. The method of claim 1 wherein the location reference codes assigned by the first data supplier and the second data supplier are bi-directional.

15. The method of claim 1 wherein the location reference codes assigned by the first data supplier and the second data supplier are uni-directional.

16. The method of claim 1 wherein the location reference codes assigned by the first data supplier are uni-directional and the location reference codes assigned by the second data supplier are bi-directional.

17. A method for providing traffic data to users of navigation systems comprising:
forming a conversion table that identifies relationships between location reference codes assigned by a first supplier and location reference codes assigned by a second supplier, wherein said relationships include exact matches wherein a location reference code of the second supplier corresponds to the same location as a location reference code of the first supplier and intermediate matches wherein a location reference code of either the first or second supplier represents a location that is not represented by a location reference code of the other supplier but which represents a location topologically between locations represented by location reference codes that are exact matches;
forming traffic messages using the location reference codes assigned by the second data supplier;
using the conversion table to convert the traffic messages formed with the location reference codes assigned by the second data supplier into traffic messages formed with the location reference codes assigned by the first data supplier; and
transmitting the traffic messages formed with the location reference codes assigned by the first data supplier to end users.

18. The method of claim 17 further comprising:
in navigation systems used by the end users, using location reference code data contained in geographic databases used by the navigation systems to associate data contained in the traffic messages formed with the location reference codes assigned by the first data supplier with data used to determine routes to destinations.

19. The method of claim 17 wherein the conversion table identifies the location reference codes assigned by the first supplier that represent locations that exactly match locations that are represented by location reference codes assigned by the second supplier.

20. The method of claim 17 wherein the conversion table identifies the location reference codes assigned by the second data supplier that do not match any location reference codes assigned by the first supplier but that represent locations that are located topologically between locations that are represented by location codes assigned by the second data supplier that exactly match location reference codes assigned by the second supplier.

21. The method of claim 17 further wherein the step of using is performed by a message converter program.

22. The method of claim 17 further comprising:
operating a message converter program to use the conversion table to convert the location reference codes assigned by the second data supplier into traffic messages formed with the location reference codes assigned by the first data supplier.

23. The method of claim 17 further comprising:
transmitting both the traffic messages formed with the location reference codes assigned by the first data supplier and the traffic messages using the location reference codes assigned by the second data supplier to end users.

24. A method of forming a conversion table for converting traffic messages that contain location reference codes assigned by a second data supplier into traffic messages that contain location reference codes assigned by a first data supplier, the method comprising:
storing in the conversion table data that identifies as exact matches the location reference codes assigned by the second data supplier and the location reference codes assigned by the first data supplier that refer to the same locations;
storing in the conversion table data that identifies as an intermediate match each location reference code assigned by the second data supplier that refers to a location that is not represented by a location reference code assigned by the first data supplier but is located between locations that are represented by location reference codes assigned by the first data supplier; and
storing in the conversion table data that identifies, for each intermediate match, the location reference codes assigned by the first data supplier that represent the locations immediately adjacent to the location represented by the location reference code identified as the intermediate match and directions relative thereto.

25. The method of claim 24 further comprising:
storing in the conversion table data that identifies as a dangling match each location reference code assigned by the first data supplier that refers to a location that is not represented by a location reference code assigned by the second data supplier but which represents a location before a first pair or after a last pair of codes that are exact matches.

26. The method of claim 24 wherein the exact matches are determined using a window search of cross roads associated with subsequent consecutive location codes contained in a first ordered list of location reference codes assigned to a road by the second data supplier for a cross road associated with a location reference code contained in a second ordered list of location reference codes assigned by the first data supplier.

27. The method of claim 26 wherein data indicating geographic coordinates of locations associated with location reference codes assigned by both data suppliers are compared to assist in determining exact matches.

28. A method for providing traffic data to end users comprising:
forming traffic messages using location reference code assigned by a second data supplier;
using a conversion table to determine whether an original traffic message formed using the location reference codes of the second data supplier indicates a traffic condition that spans a stretch of road represented by more than one chain of location reference codes assigned by a first data supplier,
if a determination is made that the original traffic message formed using the location reference codes of the second data supplier indicates a traffic condition that spans a stretch of road represented by more than one chain of location reference codes assigned by the first data supplier, converting the original traffic message formed with the location reference codes assigned by the second data supplier into multiple traffic messages formed with the location reference codes assigned by the first data supplier; and
transmitting the traffic messages formed with the location reference codes assigned by the first data supplier to end users.

29. A method for providing traffic data to end users comprising:
forming an original traffic message that uses location reference codes assigned by a second data supplier; and
using said original traffic message to form at least one traffic message that uses location reference codes assigned by a first data supplier;
wherein said traffic message that uses location reference codes assigned by the first data supplier is formed by
using a conversion table to identify whether a location reference code used by an original traffic message represents a location that is also represented by a location reference code assigned by the first data supplier, and if so,
substituting the location reference code used by the original traffic message with the location reference code assigned by the first data supplier that represents the location;
but if the location reference code used by the original traffic message represents a location that is not represented by a location reference code assigned by the first data supplier,
using a program to select which location reference code assigned by the first data supplier to use to substitute for the location reference code used by the original traffic message.

30. The method of claim 29 wherein said program selects the location reference code assigned by the first data supplier that represents the first location represented by a location reference code assigned by the first data supplier located immediately downstream in the direction of traffic from the location represented by the code used by the original traffic message.

31. The method of claim 29 wherein said program selects the location reference code assigned by the first data supplier that represents the first location represented by a location reference code assigned by the first data supplier located immediately downstream in the direction of traffic from the location represented by the location reference code used by the original traffic message, unless the location represented by the location reference code used by the original traffic message is located within a predetermined distance of a location represented by a location reference code assigned by the first data supplier located immediately upstream in the direction of traffic from the location represented by the location reference code used by the original traffic message.

* * * * *